United States Patent
Sugai et al.

(10) Patent No.: US 7,930,433 B2
(45) Date of Patent: Apr. 19, 2011

(54) STREAM DISTRIBUTION SYSTEM

(75) Inventors: Toyokazu Sugai, Tokyo (JP); Junichi Yokosato, Tokyo (JP); Fuminobu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 448 days.

(21) Appl. No.: 11/918,014

(22) PCT Filed: May 25, 2005

(86) PCT No.: PCT/JP2005/009550
§ 371 (c)(1),
(2), (4) Date: Oct. 5, 2007

(87) PCT Pub. No.: WO2006/126260
PCT Pub. Date: Nov. 30, 2006

(65) Prior Publication Data
US 2009/0041155 A1   Feb. 12, 2009

(51) Int. Cl.
G06F 15/16 (2006.01)
(52) U.S. Cl. ........ 709/246; 709/204; 709/231; 709/238; 370/270; 370/389; 705/40
(58) Field of Classification Search .......... 709/238–246; 370/401
See application file for complete search history.

(56) References Cited

U.S. PATENT DOCUMENTS

| | | | |
|---|---|---|---|
| 7,349,986 B2 * | 3/2008 | Takeuchi et al. | 709/243 |
| 7,792,982 B2 * | 9/2010 | Padmanabhan et al. | 709/231 |
| 2002/0124097 A1 * | 9/2002 | Isely et al. | 709/231 |
| 2002/0152317 A1 * | 10/2002 | Wang et al. | 709/231 |
| 2003/0014241 A1 * | 1/2003 | Ferris et al. | 704/200.1 |
| 2003/0135553 A1 * | 7/2003 | Pendakur | 709/205 |
| 2004/0010614 A1 * | 1/2004 | Mukherjee et al. | 709/231 |
| 2004/0064574 A1 * | 4/2004 | Kurauchi | 709/231 |
| 2004/0081242 A1 * | 4/2004 | Segev | 375/240.25 |
| 2004/0177161 A1 * | 9/2004 | Hoang | 709/246 |
| 2005/0013281 A1 * | 1/2005 | Milton et al. | 370/349 |
| 2005/0102427 A1 * | 5/2005 | Yokota et al. | 709/245 |
| 2005/0188073 A1 * | 8/2005 | Nakamichi et al. | 709/223 |
| 2005/0265395 A1 * | 12/2005 | Kim et al. | 370/485 |
| 2006/0265657 A1 * | 11/2006 | Gilley | 715/730 |
| 2007/0002874 A1 * | 1/2007 | Kang et al. | 370/401 |
| 2007/0204064 A1 * | 8/2007 | Mail et al. | 709/246 |
| 2007/0264989 A1 * | 11/2007 | Palakkal et al. | 455/416 |
| 2009/0123130 A1 * | 5/2009 | Kim | 386/124 |

FOREIGN PATENT DOCUMENTS

JP   9-288604 A   11/1997

(Continued)

*Primary Examiner* — Wing F Chan
*Assistant Examiner* — Razu A Miah
(74) *Attorney, Agent, or Firm* — Birch, Stewart, Kolasch & Birch, LLP.

(57) ABSTRACT

A system includes a content server device for performing content distribution in a network; a reception terminal device capable of reproducing a content having a specific format; a plurality of transcoder devices provided in the network, for applying format conversion to a content distributed in the network; and a transcoder management device for searching, in response to a search request sent from the reception terminal device, information on the plurality of transcoder devices, and sending to the reception terminal device, as a search result, a transmission path which runs from the content server device to the reception terminal device via at least one of the plurality of transcoder devices, through which format conversion to a desired content can be performed.

15 Claims, 10 Drawing Sheets

FOREIGN PATENT DOCUMENTS

| | | |
|---|---|---|
| JP | 10-40204 A | 2/1998 |
| JP | 2002-232860 A | 8/2002 |
| JP | 2002-374298 A | 12/2002 |
| JP | 2004-46879 A | 2/2004 |
| JP | 2004-48190 A | 2/2004 |
| WO | WO-2004-073269 A1 | 8/2004 |

* cited by examiner

STREAM DISTRIBUTION SYSTEM

TECHNICAL FIELD

The present invention relates to a stream distribution system in which a plurality of various transcoder devices for performing various types of conversion are provided in a network, and the transcoder devices cooperate with each other to perform content format conversion corresponding to a reproduction capability of a reception terminal device.

BACKGROUND ART

In conventional stream distribution systems, a transcoder device for performing conversion to a required format is fixedly provided in, for example, a server to perform stream distribution in a desired format (see Patent Document 1, for example).

For example, transcoder devices are provided separately from the server as independent devices to provide a different service, and individual format conversion is performed by a single transcoder device, thereby performing stream distribution in a desired format (see Patent Document 2, for example).

A transcoder management server which manages such transcoder devices, and, in response to a cooperation request sent from the transcoder devices, causes the plurality of transcoder devices to cooperate with each other is used to perform stream conversion with the plurality of transcoder devices in cooperation with each other, thereby performing stream distribution in a desired format (see Patent Document 3, for example).

Patent Document 1: JP 2002-232860 A
Patent Document 2: JP 2004-48190 A
Patent Document 3: JP 2002-374298 A

DISCLOSURE OF THE INVENTION

Problems to be Solved by the Invention

Among the conventional stream distribution systems, in a system in which the transcoder device is provided in the server or a system in which the transcoder device is operated separately from the server as an independent device to perform individual transcoding, there has been a problem in that formats that can be handled in those systems are limited within a fixed range of the conversion capability of the transcoder device, and thus, it is not always possible to perform stream distribution in a format required by the reception terminal device.

Further, in order to solve the problem as described above, solving means such as that described in Patent Document 3 has been proposed, in which a plurality of various transcoder devices for performing various types of conversion are arranged in a network, and the transcoder devices cooperate with each other to provide a content format conversion service corresponding to the reproduction capability of a reception terminal device. However, in Patent Document 3, each transcoder device makes an inquiry to the transcoder management server for the purpose of cooperating with another transcoder device. Since transcoder cooperation is always achieved under the presumption that the transcoder device that has made an inquiry mediates between the devices, even if a better transcoder cooperation exists (which is achieved without the intermediation of the transcoder device that has made an inquiry), the better transcoder cooperation cannot be employed, which implies lack of flexibility in the system. Further, the transcoder device must include, as components, request processing means and reply processing means for processing a request/response sent from a reception device, leading to an increase in cost of the transcoder device.

The present invention has been made to solve the above-mentioned problems, and it is an object of the present invention to provide a stream distribution system capable of performing content format conversion corresponding to the reproduction capability of the reception terminal device by having the transcoder devices more flexibly cooperate with each other.

Means for Solving the Problems

According to the present invention, there is provided a stream distribution system including: a content server device for performing content distribution in a network; a reception terminal device capable of reproducing a content having a specific format; a plurality of transcoder devices provided in the network, for applying format conversion to a content distributed in the network; and a transcoder management device for searching, in response to a search request sent from the reception terminal device, information on the plurality of transcoder devices, and sending to the reception terminal device, as a search result, a transmission path which runs from the content server device to the reception terminal device via at least one of the plurality of transcoder devices, through which format conversion to a desired content can be performed.

Effects of the Invention

The stream distribution system according to the present invention has an effect that content format conversion corresponding to the reproduction capability of the reception terminal device can be performed by having the transcoder devices more flexibly cooperate with each other.

BEST MODE FOR CARRYING OUT THE INVENTION

First to ninth embodiments of the present invention will be described.

First Embodiment

Figure 1:
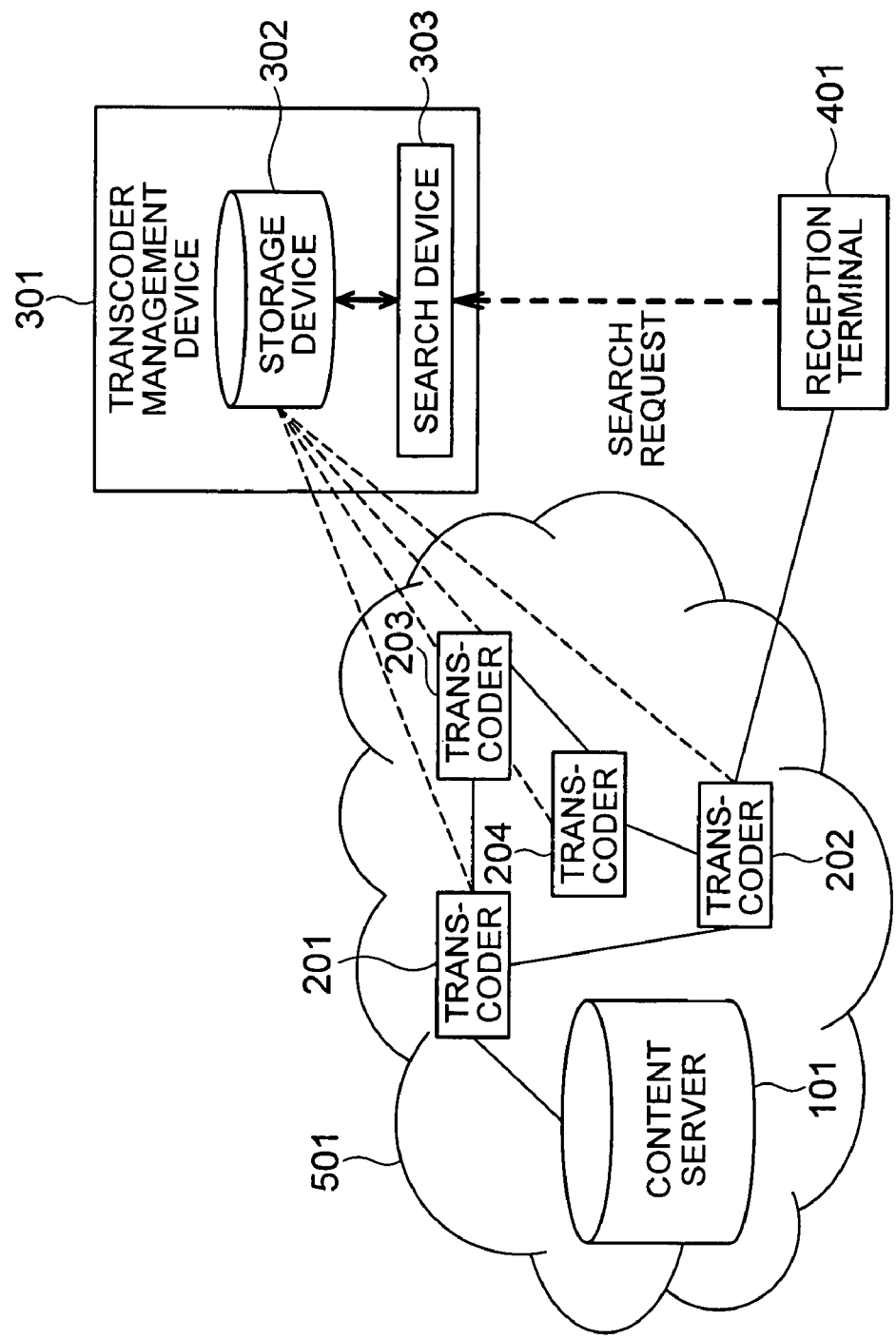
FIG. 1 is a block diagram showing a configuration of a stream distribution system according to a first embodiment of the present invention.

A stream distribution system according to a first embodiment of the present invention will be described with reference to FIGS. 1 to 3. FIG. 1 is a block diagram showing a configuration of the stream distribution system according to the first embodiment of the present invention. In the drawings, identical reference symbols indicate identical or corresponding portions.

In FIG. 1, the stream distribution system according to the first embodiment includes a content server device 101, a plurality of transcoder devices 201, 202, 203, 204, ..., a transcoder management device 301, and a reception terminal device 401.

The content server device 101 accumulates stream data such as video data and audio data, and sends out the stream data to a network 501 in response to a request such as "a transmission request" sent from the reception terminal device 401.

The transcoder devices 201, ... convert in the network 501 the format of stream data sent from the content server device 101 into another appropriate format and send the stream data obtained by the conversion. The transcoder devices 201, ... can apply identical format conversion not only to stream data directly distributed from the content server device 101 but also to stream data sent from other transcoder devices. It is assumed that the other transcoder devices are provided at a plurality of locations in the network 501 as shown in FIG. 1 or are included in the content server device 101.

The transcoder management device 301 serves as a database for collectively managing the location information and the format conversion capabilities of the plurality of transcoder devices 201, ..., provided in the network 501. The transcoder management device 301 includes a transcoder storage device 302 for storing the location information and the information on format conversion capabilities of the transcoder devices 201, ..., and a transcoder search device 303 for searching the location information and the information on format conversion capabilities of the transcoder devices 201, ....

The reception terminal device 401 receives stream data which has been sent from the content server device 101 and to which format conversion has been applied by various transcoder devices on the way to the reception terminal device 401, and displays the stream data on a screen or the like.

Figure 2:
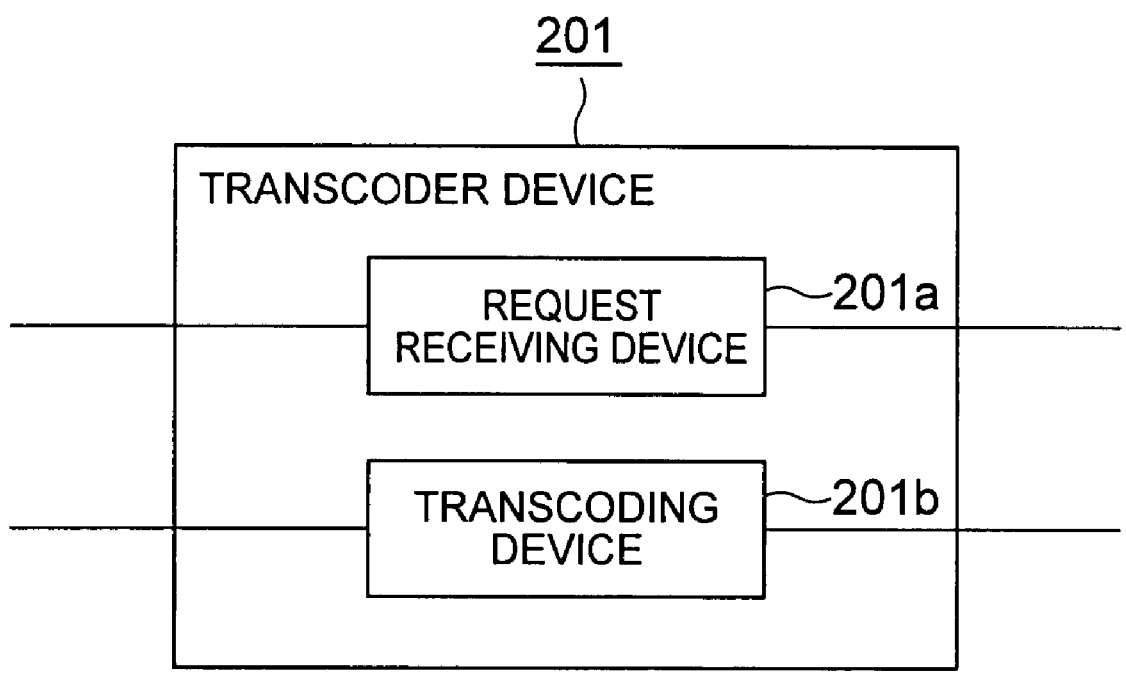
FIG. 2 is a block diagram showing a configuration of a transcoder device of the stream distribution system according to the first embodiment of the present invention.

FIG. 2 is a block diagram showing a configuration of the transcoder device of the stream distribution system according to the first embodiment of the present invention.

In FIG. 2, the transcoder device 201 (202, 203, 204, ...) includes a request receiving device 201a and a transcoding device 201b.

The request receiving device 201a receives a request sent over the network 501, the request concerning the settings such as the start or the stop of transcoding and stream conversion mode switching. Based on the "stream conversion request" received by the request receiving device 201a, the transcoding device 201b converts stream data after changing, if necessary, the stream conversion mode (conversion resolution, format, and the like).

Next, an operation of the stream distribution system according to the first embodiment will be described with reference to FIG. 3. FIG. 3 is a diagram showing the operation of the stream distribution system according to the first embodiment of the present invention.

First, on the assumption that the location of the content server device 101 on the network 501 is already known, the reception terminal device 401 sends a "search request" to the transcoder management device 301 in order to search for a transcoder device for connecting the content server device 101 to the reception terminal device 401, regarding the content that the reception terminal device 401 wishes to receive.

In the transcoder management device 301, the transcoder search device 303 searches information on the locations of the transcoder devices on the network 501 and the transcoder capabilities of the transcoder devices, stored in the transcoder storage device 302. The transcoder management device 301 extracts one or more combinations of one or more transcoder devices that can connect the content server device 101 to the reception terminal device 401, to generate one or more transmission paths for content distribution.

Figure 3:
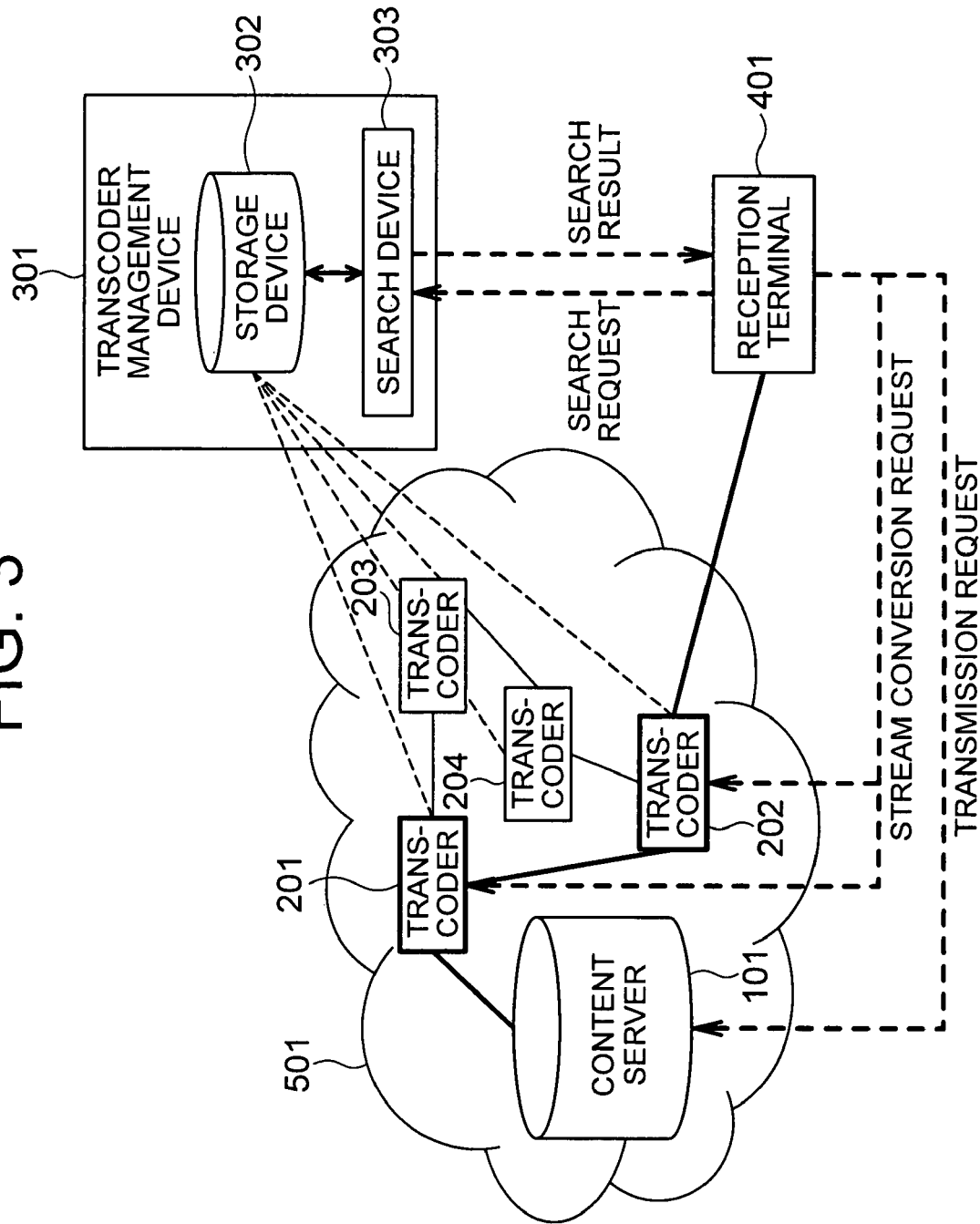
FIG. 3 is a diagram showing an operation of the stream distribution system according to the first embodiment of the present invention.

FIG. 3 shows an example of a transmission path for content distribution. In this case, it is assumed that the reception terminal device 401 desires to receive a content X of the content server device 101, but the video format of the content X is MPEG-2 while the video decoding and display capability of the reception terminal device 401 is limited to the format of MPEG-4 and QCIF (176×144 dots).

The transcoder search device 303 accesses the transcoder storage device 302 based on the "search request" sent from the reception terminal device 401 and searches for a combination of transcoder devices that can perform conversion from MPEG-2 to MPEG-4 and QCIF. The transcoder search device 303 selects the transcoder devices 201 and 202, for example, as a result of the search. The transcoder device 201 is capable of converting MPEG-2 into MPEG-4 and CIF (352×288 dots), and the transcoder device 202 is capable of converting MPEG-4 and CIF into MPEG-4 and QCIF.

Then, the content X of the content server device 101 is converted by the transcoder device 201 from MPEG-2 to MPEG-4 and CIF and is also converted by the transcoder device 202 from MPEG-4 and CIF to MPEG-4 and QCIF, thereby eventually performing conversion into MPEG-4 and QCIF and providing the reception terminal device 401 with stream data having a desired format.

Therefore, the stream transmission path connects the content server device 101, the transcoder device 201, the transcoder device 202, and the reception terminal device 401 in the stated order. In response to the "search request" sent from the reception terminal device 401, the transcoder search device 303 sends a "search result" to the reception terminal device 401. The "search result" includes: information on each of the selected transcoder devices 201 and 202, such as the IP address and the conversion capability of each transcoder device (for example, MPEG-2 into MPEG-4 and CIF in the transcoder device 201); and information on the transmission path (which connects the content server device 101, the transcoder device 201, the transcoder device 202, and the reception terminal device 401 in the stated order).

The reception terminal device 401 receives the search result from the transcoder search device 303 and sends a "transmission request" for the content X to the content server device 101. Note that in the transmission request, the transcoder device 201 is specified as the transmission destination of the content X. At the same time, the reception terminal device 401 sends a "stream conversion request" to the transcoder device 201 with the transcoder device 202 being specified as the transmission destination of the stream to be obtained by the conversion. Further, at the same time, the reception terminal device 401 sends a "stream conversion request" to the transcoder device 202 with the reception terminal device 401 being specified as the transmission destination of the stream to be obtained by the conversion.

As described above, based on the "search request" from the reception terminal device 401, the transcoder search device 303 searches for a transmission path connecting a plurality of transcoder devices, and the reception terminal device 401 sends the "transmission request" to the content server device 101 and the "stream conversion request" to each of the transcoder devices 201, . . . included in the transmission path, to cause the content server device 101 to send the stream and to cause each of the transcoder devices 201, . . . included in the transmission path to convert the stream. Therefore, the reception terminal device 401 can receive and reproduce the desired content having a desired format.

Also, even when a need for conversion into a new format arises, it is only necessary to provide a new transcoder device for performing conversion into the format on the network 501 or in the content server device 101 and to register information on the location of the new transcoder device on the network 501 and the transcoding capability of the new transcoder device, in the transcoder management device 301. Thus, it is possible to ensure flexibility to cope with an increase in format types.

Second Embodiment

Figure 4:
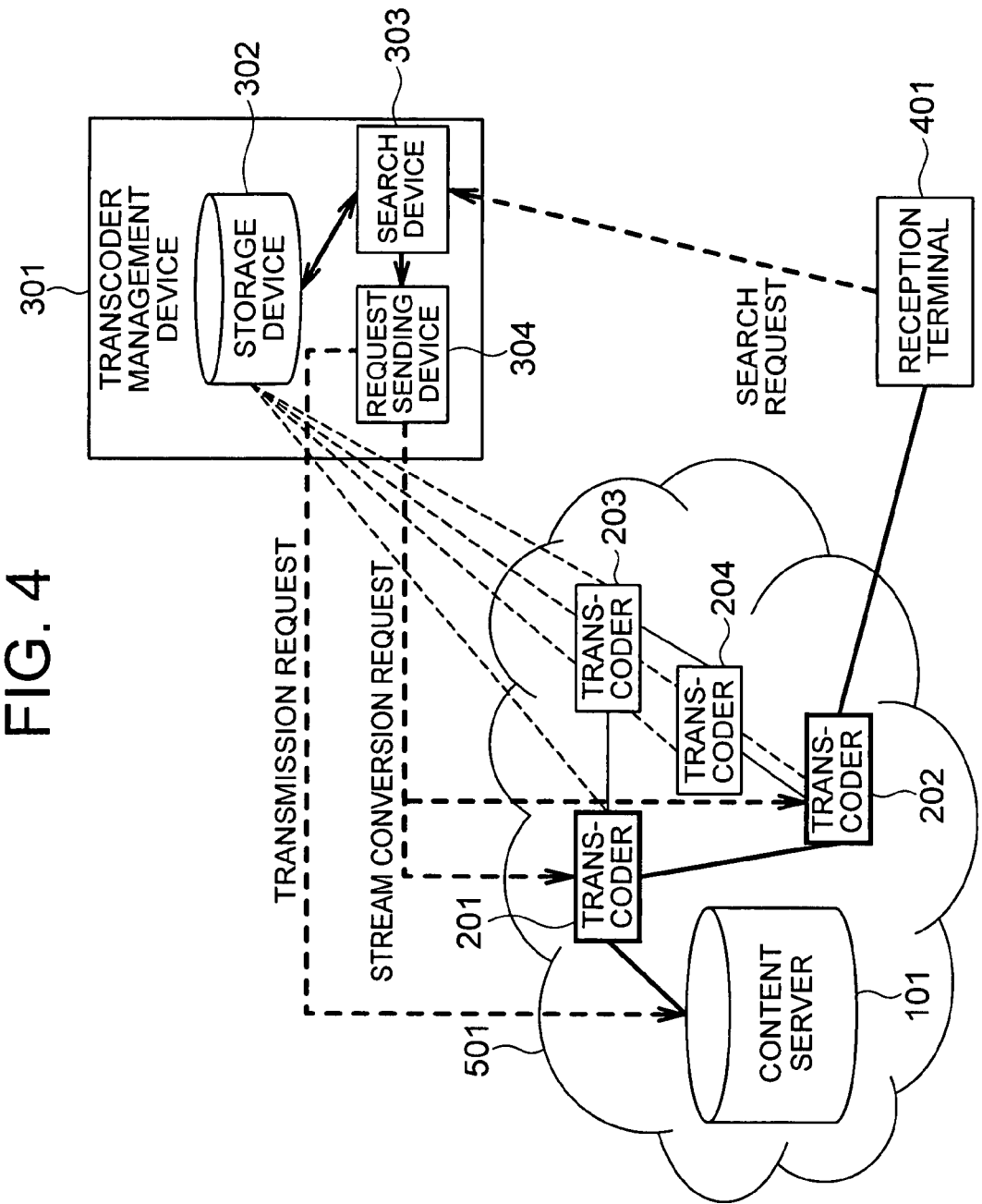
FIG. 4 is a block diagram showing a configuration of a stream distribution system according to a second embodiment of the present invention.

A stream distribution system according to a second embodiment of the present invention will be described with reference to FIGS. 4 and 5. FIG. 4 is a block diagram showing a configuration of the stream distribution system according to the second embodiment of the present invention.

In FIG. 4, the stream distribution system according to the second embodiment includes a content server device 101, a plurality of transcoder devices 201, 202, 203, 204, . . . , a transcoder management device 301, and a reception terminal device 401.

In FIG. 4, the transcoder management device 301 includes, in addition to the transcoder storage device 302 and the transcoder search device 303, which are described in the first embodiment, a request sending device 304 for sending a "transmission request" to the content server device 101 and a "stream conversion request" to the transcoder device based on a search result.

In the first embodiment, in response to a "search request" sent from the reception terminal device 401, the transcoder search device 303 returns a "search result" to the reception terminal device 401, and then conversion is performed by a combination of the plurality of transcoder devices, thereby enabling content distribution for a desired content having a desired format. On the contrary, in the second embodiment, a description is given to a case where the transcoder search device 303 returns a "search result"to a device other than the reception terminal device 401.

The reception terminal device 401 sends a "search request" identical to that described in the first embodiment to the transcoder search device 303. As in the first embodiment, it is assumed that the transcoder search device 303 selects the transcoder devices 201 and 202 as "search results".

At this time, unlike in the first embodiment in which the "search result" is returned to the reception terminal device 401, the transcoder search device 303 returns the "search result"to the request sending device 304. The request sending device 304 directly sends a "transmission request" to the content server device 101 and a "stream conversion request" to each of the transcoder devices 201 and 202 based on the received search result.

First, the request sending device 304 sends to the content server device 101a "transmission request" to send the content X requested by the reception terminal device 401 to the transcoder device 201. Next, the request sending device 304 sends to the transcoder device 201 a "stream conversion request" to convert the format of the received content X from MPEG-2 to MPEG-4 and CIF, and to send the conversion result to the transcoder device 202. Further, the request sending device 304 sends to the transcoder device 202 a "stream conversion request" to convert the format of a received content X' (content X whose format has been converted into MPEG-4 and CIF by the transcoder device 201) from MPEG-4 and CIF to MPEG-4 and QCIF, and to send the conversion result to the reception terminal device 401. The reception terminal device 401 receives stream data (content X whose format has been converted into MPEG-4 and QCIF) from the transcoder device 202.

As described above, a "search result" is not returned to the reception terminal device 401, and the request sending device 304 directly sends a "transmission request" to the content server device 101 and a "stream conversion request" to each of the transcoder devices 201 and 202. Thus, the same advantages as in the first embodiment can be obtained.

Figure 5:
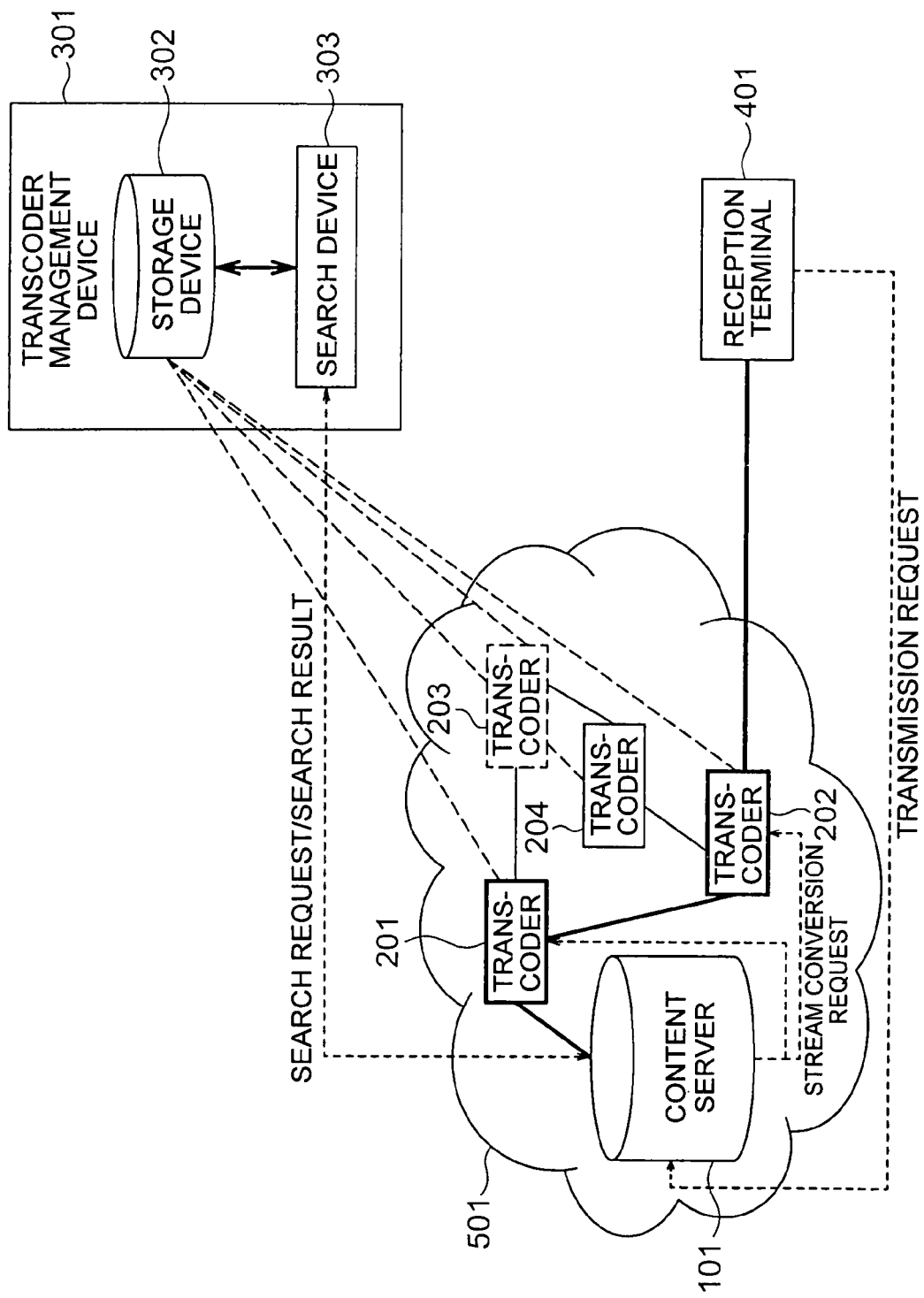
FIG. 5 is a block diagram showing another configuration of the stream distribution system according to the second embodiment of the present invention.

FIG. 5 is a block diagram showing another configuration of the stream distribution system according to the second embodiment of the present invention.

Instead of sending a "search request" to the transcoder management device 301, the reception terminal device 401 sends a "transmission request" for the content to be received, to the content server device 101 as shown in FIG. 5. Based on the "transmission request", the content server device 101 sends a "search request"to the transcoder search device 303. Conversion of the format of the content may be started when the transcoder search device 303 returns a "search result" to the content server device 101, and the content server device 101 sends a "stream conversion request"to each of the transcoder devices 201 and 202 based on the search result.

Further, even in the configuration of FIG. 4 in which the request sending device 304 of the transcoder management device 301 sends a "transmission request" and a "stream conversion request", the same advantages can also be obtained when the reception terminal device 401 informs the content server device 101 in advance of information on the content to be received, and the content server device 101 sends a "search request" to the transcoder search device 303, without using a "search request" sent from the reception terminal device 401.

Third Embodiment

Figure 6:
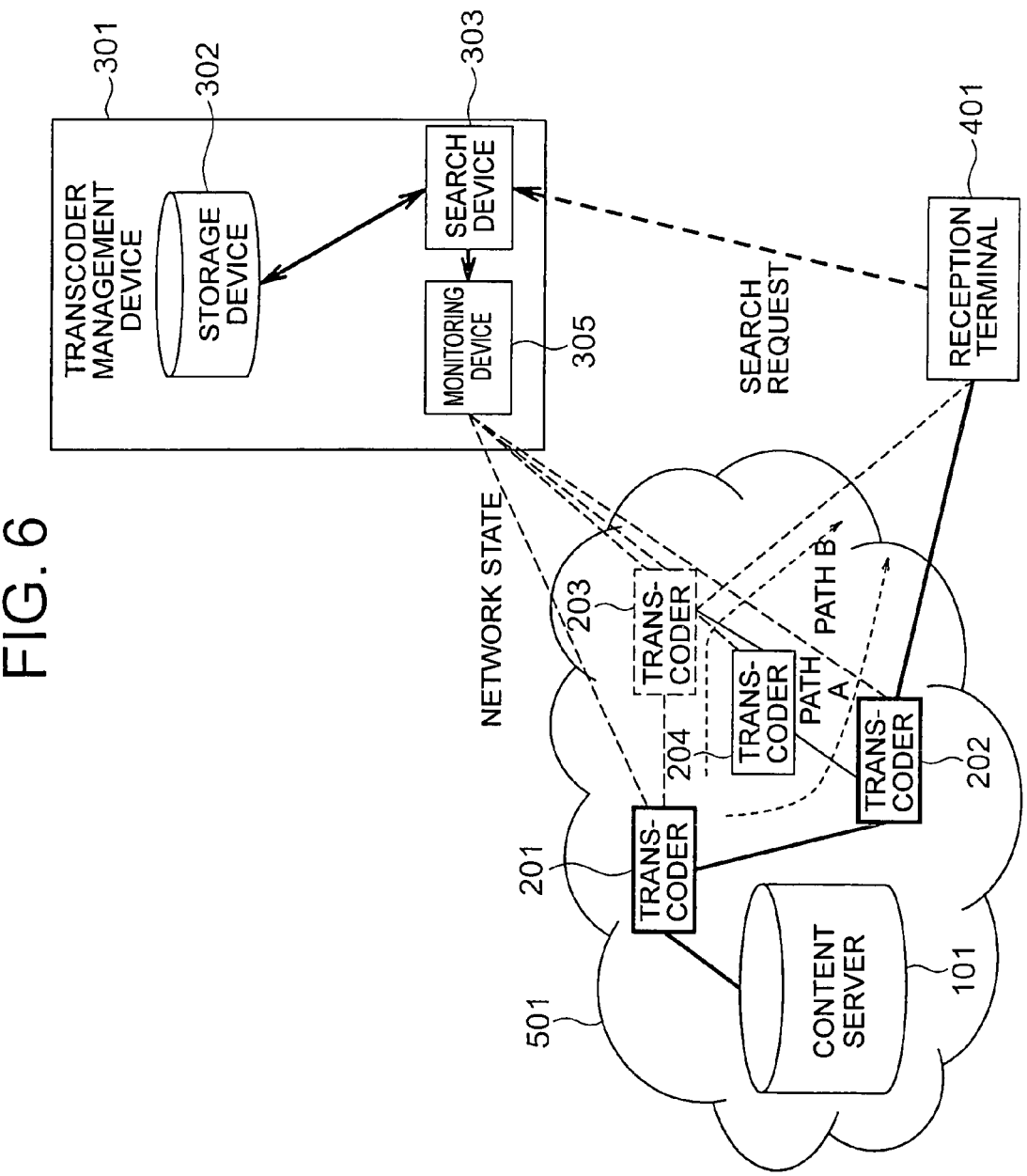
FIG. 6 is a block diagram showing a configuration of a stream distribution system according to a third embodiment of the present invention.

A stream distribution system according to a third embodiment of the present invention will be described with reference to FIGS. 6 and 7. FIG. 6 is a block diagram showing a configuration of the stream distribution system according to the third embodiment of the present invention.

In FIG. 6, the stream distribution system according to the third embodiment includes a content server device 101, a plurality of transcoder devices 201, 202, 203, 204, . . . , a transcoder management device 301, and a reception terminal device 401.

In FIG. 6, the transcoder management device 301 further includes a network monitoring device 305 in addition to the transcoder storage device 302 and the transcoder search device 303, which are described in the first embodiment.

The network monitoring device 305 fully monitors the line quality (for example, a network delay, jitter, and a line utilization rate indicating a congestion state) of each network path connecting individual transcoder devices in the network 501 in which the plurality of transcoder devices are provided.

Figure 7:
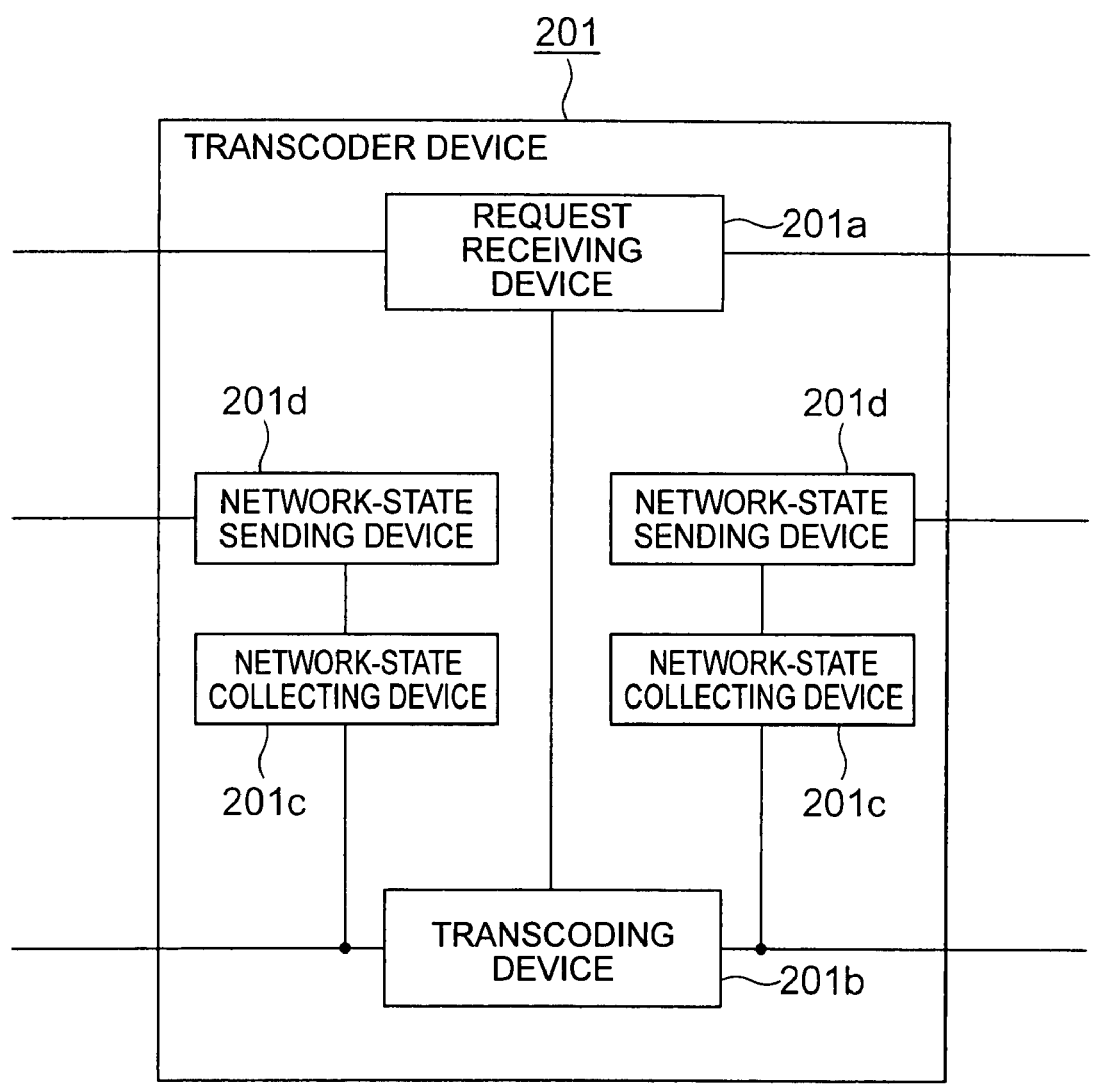
FIG. 7 is a block diagram showing a configuration of a transcoder device of the stream distribution system according to the third embodiment of the present invention.

FIG. 7 is a block diagram showing a configuration of a transcoder device of the stream distribution system according to the third embodiment of the present invention.

In FIG. 7, the transcoder device 201 (202, 203, 204, ...) includes two network-state collecting devices 201c and two network-state sending devices 201d, in addition to the request receiving device 201a and the transcoding device 201b which are described in the first embodiment. One of the network-state collecting devices 201c is connected to a network interface part corresponding to an input part of the transcoding device 201b. The other one of the network-state collecting devices 201c is connected to a network interface part corresponding to an output part of the transcoding device 201b.

The network-state collecting devices 201c collect information on a line quality of the network 501. The network-state sending devices 201d send the information on a line quality collected by the network-state collecting devices 201c to the network monitoring device 305 of the transcoder management device 301 as the current network state of the own transcoder device.

In the above embodiments, the transcoder search device 303 extracts a "search result" in response to a "search request" sent from the reception terminal device 401 or the content server device 101, the reception terminal device 401 or the request sending device 304 sends a "transmission request" to the content server device 101, and the reception terminal device 401, the request sending device 304, or the content server device 101 sends a "stream conversion request" to the transcoder devices 201 and 202. Accordingly, conversion is performed with the cooperation among the plurality of transcoder devices, thereby enabling content distribution of a desired content in a desired format. The third embodiment describes a case where, in addition to the contents of the above embodiments, the transcoder management device 301 is made capable of providing a more appropriate transmission path while grasping a network (N/W) state.

FIG. 6 shows an example in which the network monitoring device 305 monitors the line quality of the network 501 through the transcoder devices. For example, the transcoder device 201 grasps the network state of a path connecting to each of the adjacent transcoder devices 202 and 203 by using the two network-state collecting devices 201c, and sends information on the line quality of each network path, such as a line utilization rate, a network delay, and jitter, to the network monitoring device 305 by using the two network-state sending devices 201d.

Since each of the transcoder devices 201, 202, 203, 204, ... sends the current line quality to the network monitoring device 305 as mentioned above, the network monitoring device 305 can grasp the current network state of each path connecting the transcoder devices. As a matter of course, the method of grasping the network state using the transcoder devices is merely an example. The network monitoring device 305 may grasp the network state using other means.

Next, a method of providing a transmission path will be described.

For example, in FIG. 6, a consideration is given to a case where, based on the condition of the format of a content, the conversion capability of each transcoder device, and the like, the transcoder search device 303 extracts, as results of transmission path search, two transmission paths: a transmission path (hereinafter, referred to as transmission path A) connecting the content server device 101, the transcoder device 201, the transcoder device 202, and the reception terminal device 401 in the stated order (hereinafter, referred to as transmission path A); and a transmission path connecting the content server device 101, the transcoder device 201, the transcoder device 203, and the reception terminal device 401 in the stated order (hereinafter, referred to as transmission path B). It is conceivable that the two transmission paths A and B are extracted, for example, when the transcoder devices 202 and 203 both have the same transcoding capability.

At this time, the network monitoring device 305 compares the network states, such as a line utilization rate, a network delay, and jitter, of the transmission path A and the transmission path B. For example, when the transmission path A has a lower line utilization rate and smaller delay and jitter, selection of the transmission path A leads to more stable content distribution. Therefore, the transcoder search device 303 extracts the transmission path A as a final search result in cooperation with the network monitoring device 305.

As described above, since the network monitoring device 305 is newly provided so that the network state can be used as information for making a further selection in the case where a plurality of search results are obtained as transmission paths, a more stable transmission path can be extracted.

Fourth Embodiment

A stream distribution system according to a fourth embodiment of the present invention will be described with reference to FIG. 6.

In the third embodiment, the network monitoring device 305 fully monitors the state of the network 501 so as to narrow down results of transmission path search. In the fourth embodiment, a description is given of an example in which the transmission path is flexibly changed according to a change in the state of the network 501.

As in the third embodiment, it is assumed in FIG. 6 that as a result of the transcoder search device 303 extracting two transmission paths, i.e., the transmission path A and the transmission path B, and selecting the transmission path A according to the network state grasped by the network monitoring device 305, content distribution is currently performed using the transmission path A.

In this situation, in the transmission path A, when available bands are reduced or delays are increased because of the congestion of network lines caused by a change in the network state, such as an increase in network traffic, and when the network monitoring device 305 judges that the transmission path A has difficulty in providing a network quality necessary for content distribution, and also judges that, after monitoring the current network state of the transmission path B, which is the other search result, it is possible to provide an equivalent network quality by changing the content distribution path to the transmission path B, the transmission path A is changed to the transmission path B for content distribution.

As described above, the dynamic state of the network 501 is fully monitored to change, if necessary, the transmission path currently used for distribution to another transmission path, so content distribution can be continued even when the quality of the network 501 is degraded.

Fifth Embodiment

A stream distribution system according to a fifth embodiment of the present invention will be described with reference to FIG. 6.

In the fourth embodiment, when the transmission path currently used for distribution has difficulty in continuing the content distribution because of degradation of the network quality, the transmission path is changed to another transmission path selected from already-extracted transmission path candidates. In the fifth embodiment, the transcoder management device 301 constantly searches for better content distribution possible.

In FIG. 6, it is assumed that content distribution is performed using the transmission path A. In the transcoder management device 301, while the network monitoring device 305 constantly grasps the network state even during the content distribution, the transcoder search device 303 constantly re-searches for a transmission path in view of the network state grasped by the network monitoring device 305, thereby searching for a transmission path through which better content distribution can be performed.

The expression "better content distribution" used herein indicates high-definition image distribution performed at a higher bit rate and content distribution performed with smaller delays, for example.

As described above, in the transcoder management device 301, the transcoder search device 303 and the network monitoring device 305 cooperate with each other to constantly re-search for a transmission path. Therefore, it is possible to find, even while the content distribution is being performed, a transmission path through which better content distribution can be performed. It is also possible to find, when the network state has been changed, a transmission path through which content distribution higher in quality than the content distribution currently performed can be performed. Conversely, by constantly re-searching for a transmission path, when the quality of content distribution cannot be maintained with the current transmission path because there has been a change in the network state, a second-to-best transmission path can be found.

Sixth Embodiment

Figure 8:
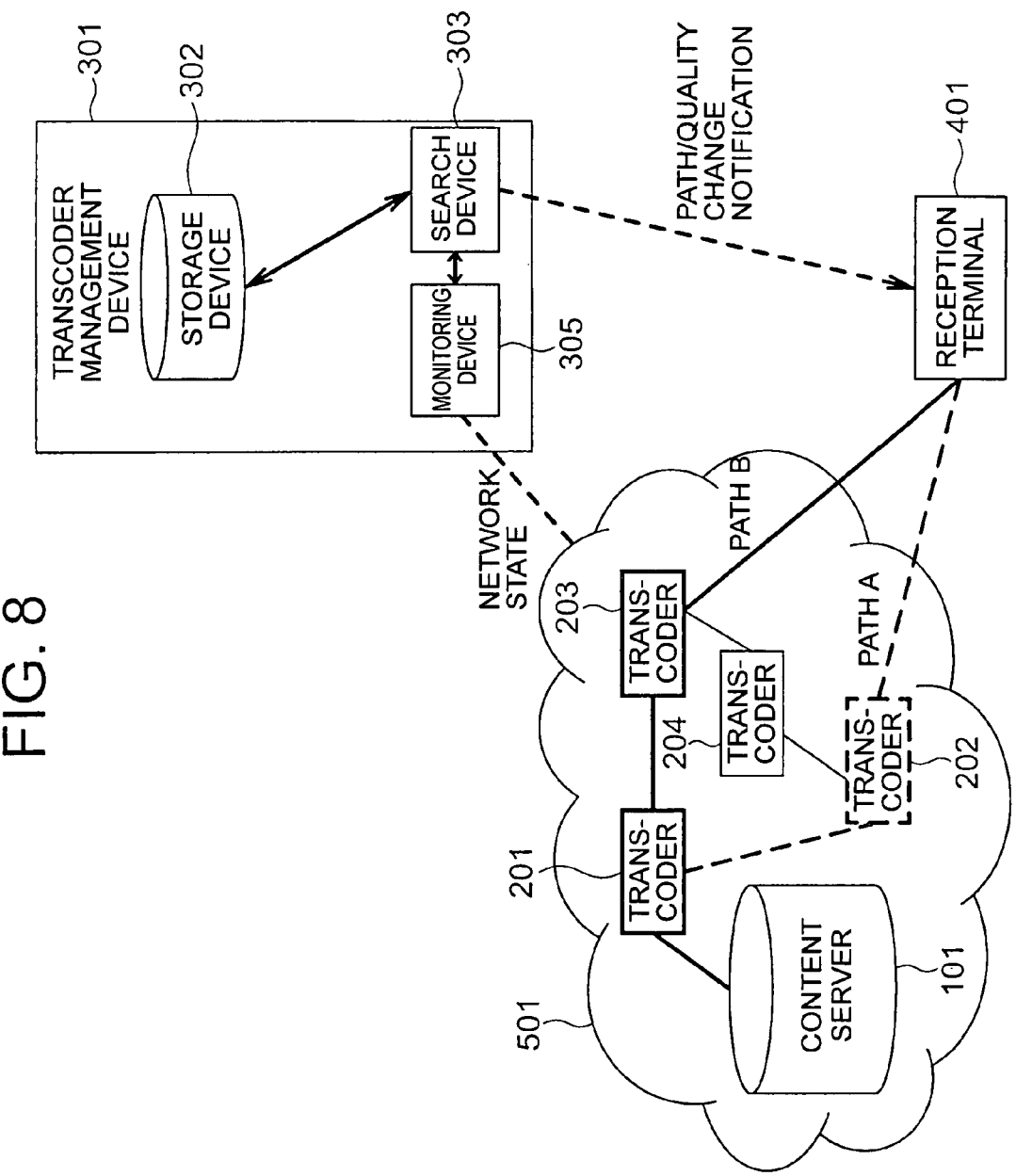
FIG. 8 is a block diagram showing a configuration of a stream distribution system according to a sixth embodiment of the present invention.

A stream distribution system according to a sixth embodiment of the present invention will be described with reference to FIG. 8. FIG. 8 is a block diagram showing a configuration of the stream distribution system according to the sixth embodiment of the present invention.

In the fifth embodiment, an alternate transmission path is constantly searched for to obtain better content distribution possible, and the transmission path currently used for distribution is changed to another transmission path if necessary. However, in the sixth embodiment, when the transmission path needs to be changed, the transcoder management device 301 sends a path change notification to the reception terminal device 401.

In FIG. 8, it is assumed that content distribution from the content server device 101 to the reception terminal device 401 is performed using the "transmission path A" running via the transcoder devices 201 and 202. It is assumed that the network monitoring device 305 constantly monitors the network state, the transcoder search device 303 keeps re-searching for an alternate transmission path based on the monitored state, and, when the network state, such as congestion and a delay, of the transmission path A is degraded, there arises a need for change to the alternate transmission path B running via the transcoder devices 201 and 203, in order to maintain the current content distribution quality.

In this situation, in a case where the current content distribution state cannot avoid being temporarily affected by a momentary interruption of content distribution which occurs when the transmission path is changed, the transcoder search device 303 sends a path change notification indicating "the content distribution will be temporarily interrupted due to a change in a network path", for example, to the reception terminal device 401. Alternatively, the transcoder search device 303 sends a path change notification indicating "the distribution path will be changed because the distribution path currently used has difficulty in continuing the content distribution", for example, to the reception terminal device 401.

There is a case where, when the bit rate, the resolution, and the like cannot avoid being changed because an alternate path appropriate to maintain the current content distribution quality is not found, the reproduction resolution has to be changed by a decoder of the reception terminal device 401. In this case, the transcoder search device 303 sends in advance a quality change notification to the reception terminal device 401, so the reception terminal device 401 can prepare in advance for the change in content quality, whereby an increase in time lag to be caused when the quality is changed can be suppressed.

Further, even in a case where the currently-used transmission path A has no trouble in performing content distribution, when it is determined that content distribution with, for example, a higher bit rate and smaller delays can be performed by using the other transmission path B, the transcoder search device 303 sends to the reception terminal device 401 a notification indicating "higher-quality content distribution can be performed by changing the path". Further, depending on circumstances, an inquiry such as "is it OK to change the path?" is made after sending the notification, and the transmission path is changed only when the reception terminal device 401 sends a notification of allowing the change to the transcoder search device 303.

As described above, with respect to a change in the transmission path, since a notification is sent or an inquiry is made to the reception terminal device 401, regarding the reception terminal device 401 and thus a viewer using the reception terminal device 401, the transmission path can be prevented from being changed unrecognizably, and the viewer can be provided with wider selections.

Seventh Embodiment

A stream distribution system according to a seventh embodiment of the present invention will be described with reference to FIG. 3.

In the above embodiments, in response to a "search request" sent from the reception terminal device 401 or the content server device 101, the transcoder search device 303 sends a "search result" to the reception terminal device 401, the request sending device 304, or the content server device 101, the reception terminal device 401 or the request sending device 304 sends a "transmission request" to the content server device 101, and the reception terminal device 401, the request sending device 304, or the content server device 101 sends a "stream conversion request" to the transcoder devices 201 and 202. Accordingly, conversion is performed with the cooperation among the plurality of transcoder devices, thereby performing content distribution of a desired content in a desired format. The seventh embodiment describes a case where, in addition to the above embodiments, the transcoder management device 301 is made capable of providing a transmission path through which transcoding can be performed at a lower cost while grasping not only the location information and the conversion capabilities of the individual transcoder devices but also service charging states of the individual transcoder devices.

In FIG. 3, it is assumed that each of the transcoder devices 201, 202, 203, 204, . . . employs a system in which the transcoder device charges the viewer using the reception terminal device 401 based on the bit rate of the content to be transcoded and the time length required for transcoding. It is also assumed that a transcoder device that does not employ this charging system exists.

The transcoder storage device 302 stores, in addition to the location information and the conversion capabilities of the individual transcoder devices, the charging system states of the individual transcoder devices. In view of the charging system states of the individual transcoder devices, the transcoder search device 303 selects a transmission path through which a transcoding service can be provided at a lower cost if a plurality of transmission paths have the same content distribution quality.

As described above, since transmission path search is performed according to the charging system states of the individual transcoder devices, a transmission path through which transcoding can be performed at a lower cost can be extracted and provided even when transcoder devices that provide a fee-charging transcoding service are included.

Eighth Embodiment

A stream distribution system according to an eighth embodiment of the present invention will be described with reference to FIG. 3.

In the above embodiments, in response to a "search request" sent from the reception terminal device 401 or the content server device 101, the transcoder search device 303 sends a "search result" to the reception terminal device 401, the request sending device 304, or the content server device 101, the reception terminal device 401 or the request sending device 304 sends a "transmission request" to the content server device 101, and the reception terminal device 401, the request sending device 304, or the content server device 101 sends a "stream conversion request" to the transcoder devices 201 and 202. Accordingly, conversion is performed with the cooperation among the plurality of transcoder devices, thereby performing content distribution of a desired content in a desired format. The eighth embodiment describes a case where, in addition to the above embodiments, in a network path between transcoder devices, a band can be occupied.

In FIG. 3, it is assumed that a service is provided in which the band required for content distribution of a given number (one or more) of contents is occupied, for example, in a network path between the transcoder devices 201 and 202.

The path provided with the service as described above is more-advantageously extracted through the search of the transcoder search device 303. However, when the band occupancy service is closely related to the charging service as described in the seventh embodiment (for example, when band occupancy is charged more), searching is performed in view of balance with a transcoding cost generated by the charging service, without necessarily limiting to a case of performing the more-advantageous extraction. Depending on circumstances, combination options of a transcoding cost and a band with which the service can be stably provided (or the quality to be stably provided of content distribution) may be provided to the reception terminal device 401 in the form of a list and the like.

As described above, when a band can be occupied in a network path between individual transcoder devices, the transcoder search device 303 performs searching in view of the presence or absence of a band occupancy service, thereby providing an option of a more stable transmission path for the reception terminal device 401.

Ninth Embodiment

Figure 9:
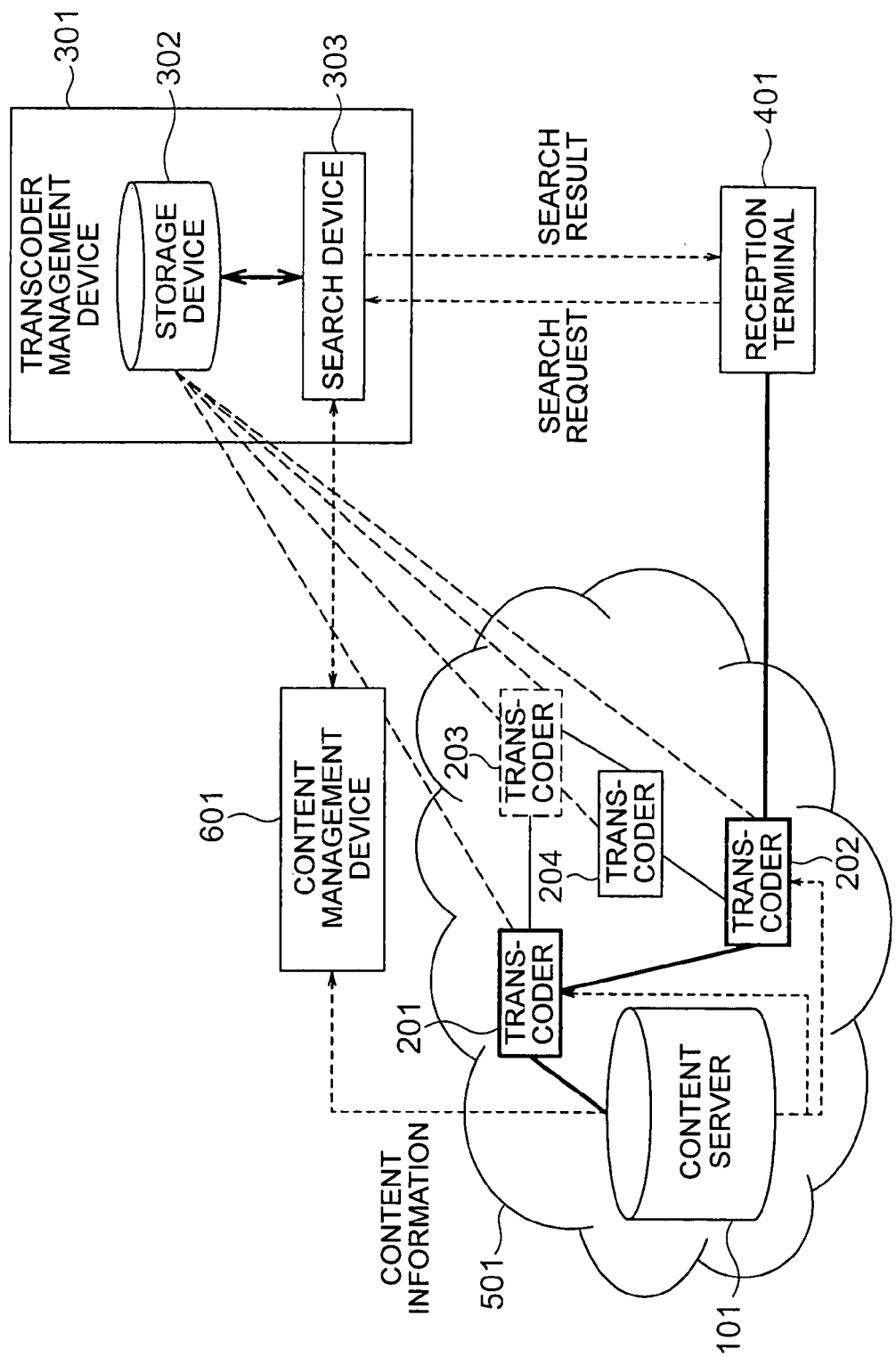
FIG. 9 is a block diagram showing a configuration of a stream distribution system according to a ninth embodiment of the present invention.

A stream distribution system according to a ninth embodiment of the present invention will be described with reference to FIGS. 9 and 10. FIG. 9 is a block diagram showing a configuration of the stream distribution system according to the ninth embodiment of the present invention.

In FIG. 9, the stream distribution system according to the ninth embodiment includes the content server device 101, a plurality of transcoder devices 201, 202, 203, 204, . . . , the transcoder management device 301, the reception terminal device 401, and the content management device 601.

The stream distribution system according to the ninth embodiment is obtained by adding a content management device 601 to the configuration of the stream distribution system of the first embodiment. The content management device 601 receives various types of information (such as the title of a content, its details, the length of time, and the video/audio format) on the contents held in the content server device 101 from the content server device 101, and also provides the information for the transcoder search device 303 of the transcoder management device 301.

In the above embodiments, in response to a "search request" sent from the reception terminal device 401 or the content server device 101, the transcoder search device 303 sends a "search result" to the reception terminal device 401, the request sending device 304, or the content server device 101, the reception terminal device 401 or the request sending device 304 sends a "transmission request" to the content server device 101, and the reception terminal device 401, the request sending device 304, or the content server device 101 sends a "stream conversion request" to the transcoder devices 201 and 202. Accordingly, conversion is performed with the cooperation among the plurality of transcoder devices, thereby performing content distribution of a desired content in a desired format. The ninth embodiment describes a case where, in addition to the above embodiments, even in cases other than the case where a specific content is to be received, the transcoder management device 301 grasps information on the contents held in the content server device 101 and provides the reception terminal device 401 with information on a content that can be received by the reception terminal device 401 from the content server device 101.

In FIG. 9, the content management device 601 provides the transcoder search device 303 with various types of information on the contents held in the content server device 101. On the other hand, the reception terminal device 401 sends to the transcoder search device 303 a "search request" to search the contents held in the content server device 101 for a content that can be received by the reception terminal device 401.

With respect to one or more contents whose information is provided by the content management device 601 from the reception terminal device 401, the transcoder search device 303 searches for a transmission path running from the content server device 101 to the reception terminal device 401, eventually selects one or more contents that can be received by the reception terminal device 401 (in some cases, no receivable content is found as a result of the search), and sends the selected one or more contents to the reception terminal device 401 as a "search result". In this way, the reception terminal device 401 can be informed of information on the one or more contents, which can be received from the content server device 101 after transcoding is applied to the one or more contents.

Note that the content server device 101, from which the content management device 601 receives information on contents, is not limited to a single server. When the content management device 601 receives content information from a plurality of content server devices, it is also possible to search the plurality of content server devices for a content that can be received by the reception terminal device 401.

Figure 10:
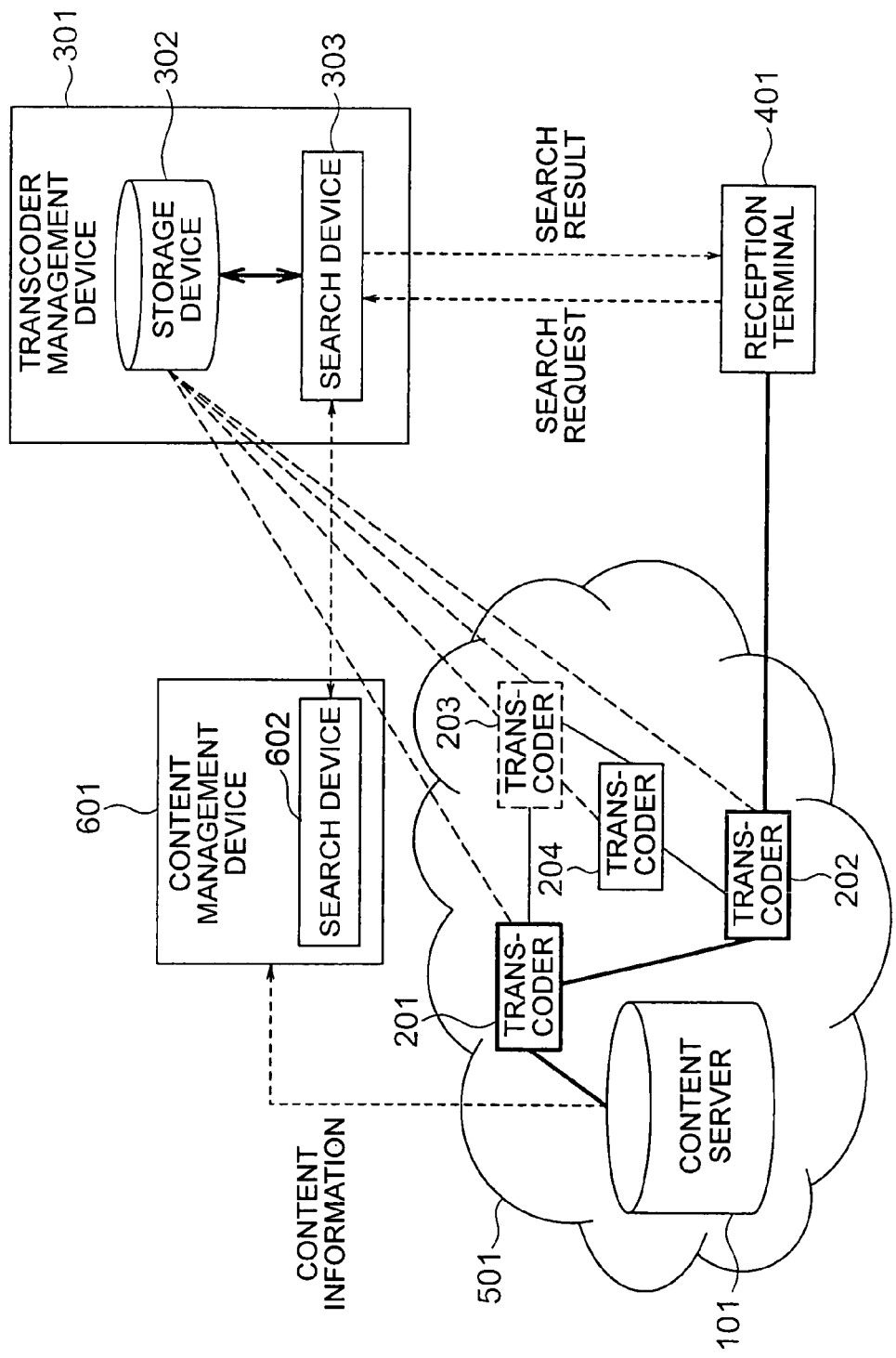
FIG. 10 is a block diagram showing another configuration of the stream distribution system according to the ninth embodiment of the present invention.

FIG. 10 is a block diagram showing another configuration of the stream distribution system according to the ninth embodiment of the present invention.

Moreover, the content search is not necessarily performed by the transcoder search device 303. As shown in FIG. 10, the content management device 601 may include a content search device 602. An operation may be performed in which the reception terminal device 401 sends a "search request" to the transcoder search device 303 or the content search device 602, the transcoder search device 303 and the content search device 602 cooperate with each other to search for a content that can be received by the reception terminal device 401, and the transcoder search device 303 or the content search device 602 returns a "search result" to the reception terminal device 401.

The invention claimed is:

1. A stream distribution system, comprising:
a content server device for performing content distribution in a network;
a reception terminal device for reproducing a content having a specific format;
a plurality of transcoder devices provided in the network, for applying format conversion to a content distributed in the network; and
a transcoder management device for searching, in response to a search request sent from the reception terminal device, information on the plurality of transcoder devices, and sending to the reception terminal device, as a search result, a transmission path which runs from the content server device to the reception terminal device via at least one of the plurality of transcoder devices, through which format conversion to a desired content is performed, wherein
the transcoder management device has a network state monitoring function for grasping a state of the network, narrows down transmission paths according to the network state, and outputs the obtained result as the search result, and
the transcoder management device changes the transmission path to another transmission path according to the network state.

2. The stream distribution system according to claim 1, wherein the transcoder management device comprises:
a transcoder storage device for storing information on locations and format conversion of the plurality of transcoder devices; and
a transcoder search device for searching the information on the locations and the format conversion of the plurality of transcoder devices based on the search request, and outputting the search result.

3. The stream distribution system according to claim 2, wherein:
the reception terminal device sends, based on the search result sent from the transcoder search device, a transmission request for the desired content with the at least one of the plurality of transcoder devices being specified as a transmission destination to the content server device, and a stream conversion request with the reception terminal device being specified as the transmission destination to the at least one of the plurality of transcoder devices;
the content server device sends the desired content to the at least one of the plurality of transcoder devices based on the transmission request; and
the at least one of the plurality of transcoder devices converts a format of the desired content sent from the content server device to the specific format and sends the converted desired content to the reception terminal device, based on the stream conversion request.

4. The stream distribution system according to claim 1, wherein each of the plurality of transcoder devices has a network state collecting function for collecting a line quality of a path which connects the transcoder device to adjacent transcoder devices, and a network state sending function for sending the collected line quality to the transcoder management device.

5. The stream distribution system according to claim 1, wherein the transcoder management device has the network state monitoring function for grasping the a state of the network, re-searches the information on the plurality of transcoder devices in view of the network state, and changes the transmission path to a transmission path through which a content distribution having higher quality than a content distribution performed prior to the change is performed.

6. The stream distribution system according to claim 1, wherein the transcoder management device has the network state monitoring function for grasping the state of the network, and sends a path change notification to the reception terminal device before changing to another transmission path according to the network state.

7. The stream distribution system according to claim 1, wherein the transcoder management device searches the information on the plurality of transcoder devices in view of a charging system state, and outputs a more inexpensive transmission path as the search result.

8. The stream distribution system according to claim 1, wherein the transcoder management device searches the information on the plurality of transcoder devices in view of a band occupancy service, and outputs a more stable transmission path as the search result.

9. The stream distribution system according to claim 1, further comprising a content management device for receiving various types of information on contents held in the content server device, and providing the transcoder management device with the various types of information on the contents,
wherein, based on the search request for a content that can be received from the content server device, the search request being sent from the reception terminal device, the transcoder management device searches the various types of information on the contents held in the content server device, specifies a content that can be received by the reception.

10. A stream distribution system, comprising:
a content server device for performing content distribution in a network;
a reception terminal device for reproducing a content having a specific format;
a plurality of transcoder devices provided in the network, for applying format conversion to a content distributed in the network; and
a transcoder management device for searching, in response to a search request sent from the reception terminal device, information on the plurality of transcoder devices, and extracting, as a search result, a transmission path which runs from the content server device to the reception terminal device via at least one of the plurality of transcoder devices, through which format conversion to a desired content is performed, wherein the transcoder management device sends the transmission path extracted to the reception terminal device, the transcoder management device has a network state monitoring function for grasping a state of the network, narrows down transmission paths according to the network state, and outputs the obtained result as the search result, and the transcoder management device changes the transmission path to another transmission path according to the network state.

11. The stream distribution system according to claim 10, wherein the transcoder management device comprises:

a transcoder storage device for storing information on locations and format conversion of the plurality of transcoder devices;

a transcoder search device for searching information on the locations and the format conversion of the plurality of transcoder devices based on the search request, and outputting the search result; and a request sending device for sending a request based on the search result.

12. The stream distribution system according to claim 11, wherein:

the request sending device sends, based on the search result sent from the transcoder search device, a transmission request for the desired content with the at least one of the plurality of transcoder devices being specified as a transmission destination to the content server device, and a stream conversion request with the reception terminal device being specified as the transmission destination to the at least one of the plurality of transcoder devices;

the content server device sends the desired content to the at least one of the plurality of transcoder devices based on the transmission request; and the at least one of the plurality of transcoder devices converts a format of the desired content sent from the content server device to the specific format and sends the converted desired content to the reception terminal device, based on the stream conversion request.

13. A stream distribution system, comprising:

a content server device for performing content distribution in a network;

a reception terminal device for reproducing a content having a specific format;

a plurality of transcoder devices provided in the network, for applying format conversion to a content distributed in the network; and a transcoder management device for searching, in response to a search request sent from the content server device based on a transmission request sent from the reception terminal device, information on the plurality of transcoder devices, and sending to the content server device, as a search result, a transmission path which runs from the content server device to the reception terminal device via at least one of the plurality of transcoder devices, through which format conversion to a desired content is performed, wherein the transcoder management device has a network state monitoring function for grasping a state of the network, narrows down transmission paths according to the network state, and outputs the obtained result as the search result, and the transcoder management device changes the transmission path to another transmission path according to the network state.

14. The stream distribution system according to claim 13, wherein the transcoder management device comprises:

a transcoder storage device for storing information on locations and format conversion of the plurality of transcoder devices; and a transcoder search device for searching information on the locations and the format conversion of the plurality of transcoder devices based on the search request, and outputting the search result.

15. The stream distribution system according to claim 14, wherein:

the content server device sends, based on the search result sent from the transcoder search device, to the at least one of the plurality of transcoder devices a stream conversion request with the reception terminal device being specified as a transmission destination, and also sends, based on the search result, the desired content to the at least one of the plurality of transcoder devices; and the at least one of the plurality of transcoder devices converts a format of the desired content sent from the content server device to the specific format and sends the converted desired content to the reception terminal device, based on the stream conversion request.

* * * * *